United States Patent [19]

Aldrich, III et al.

[11] Patent Number: 5,233,890
[45] Date of Patent: Aug. 10, 1993

[54] TRANSMISSION TORQUE CONVERTER CLUTCH DISABLE CONTROL

[75] Inventors: William L. Aldrich, III, Davisburg; Larry T. Nitz, Troy; Mark DeBacker, Romeo, all of Mich.

[73] Assignee: Saturn Corporation, Troy, Mich.

[21] Appl. No.: 861,412

[22] Filed: Mar. 31, 1992

[51] Int. Cl.⁵ .................. B60K 41/04; F16H 61/14
[52] U.S. Cl. .......................... 74/890; 74/856; 74/878
[58] Field of Search .................. 74/856, 878, 890

[56] References Cited

U.S. PATENT DOCUMENTS

| | | | |
|---|---|---|---|
| 3,805,640 | 4/1974 | Schneider et al. | 74/866 X |
| 4,338,832 | 7/1982 | Pelligrino | 74/866 |
| 4,441,385 | 4/1984 | Taga et al. | 74/890 X |
| 4,494,423 | 1/1985 | McCarthy et al. | 74/869 |
| 4,495,576 | 1/1985 | Ito | 74/890 X |
| 4,574,925 | 3/1986 | Nishimura et al. | 74/878 X |
| 4,679,450 | 7/1987 | Hayakawa et al. | 74/866 |
| 4,756,213 | 7/1988 | Mainquist et al. | 74/866 |
| 4,841,813 | 6/1989 | Fujiwara et al. | 74/866 |
| 4,920,829 | 5/1990 | Takada et al. | 74/878 X |
| 4,955,258 | 9/1990 | Ito et al. | 74/878 X |
| 4,989,702 | 2/1991 | Yoshimura et al. | 74/890 X |

FOREIGN PATENT DOCUMENTS

| | | | |
|---|---|---|---|
| 42542 | 12/1981 | European Pat. Off. | 74/890 |
| 44487 | 1/1982 | European Pat. Off. | 74/890 |

*Primary Examiner*—Leslie A. Braun
*Assistant Examiner*—David E. Henn
*Attorney, Agent, or Firm*—Mark A. Navarre

[57] ABSTRACT

An improved control of a motor vehicle torque converter clutch (TCC) which detects a condition of TCC engagement when open converter operation is required, and activates an override mechanism to disengage the TCC independent of the normal TCC control in response to the detected condition. This ensures that the TCC is disengaged when open converter operation is required, thereby permitting continued operation of the vehicle in conditions where the vehicle would otherwise be inoperable. When unwanted TCC engagement is detected, the control activates a clutch priority valve by intentionally commanding the engagement of two or more range clutches. When so activated, the clutch priority valve exhausts all but one range clutch and hydraulically disables engagement the TCC. When the vehicle speed is sufficiently high to permit TCC engagement, all but one of the range clutch pressure commands are eliminated, and the clutch priority valve returns to a normal state to permit TCC engagement.

8 Claims, 8 Drawing Sheets

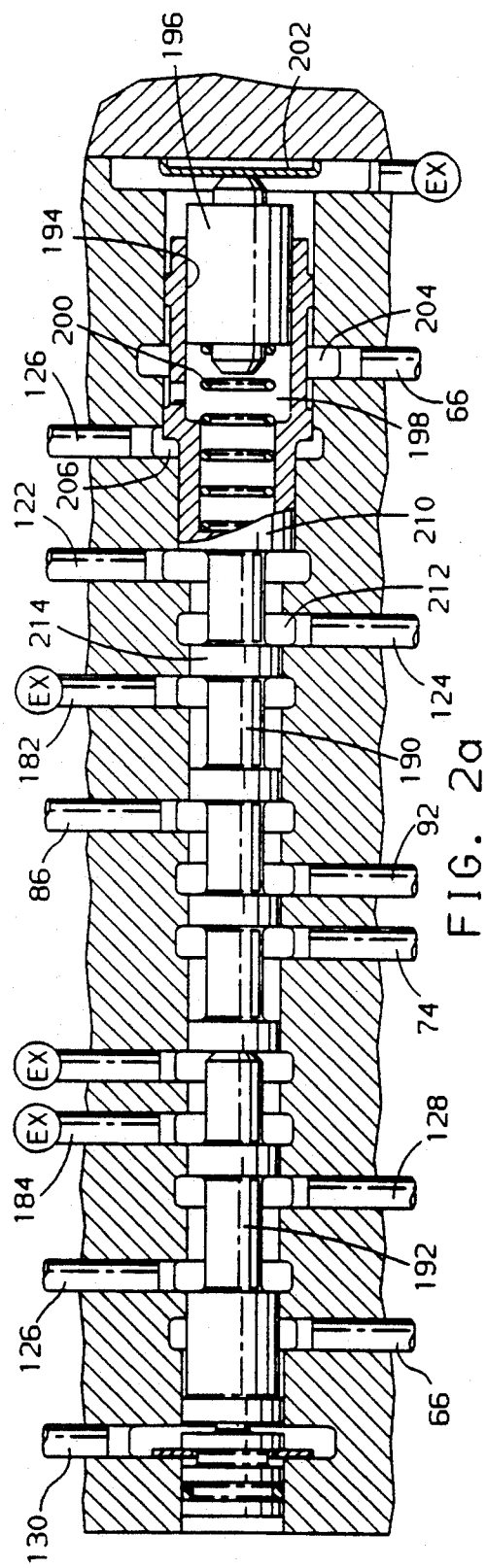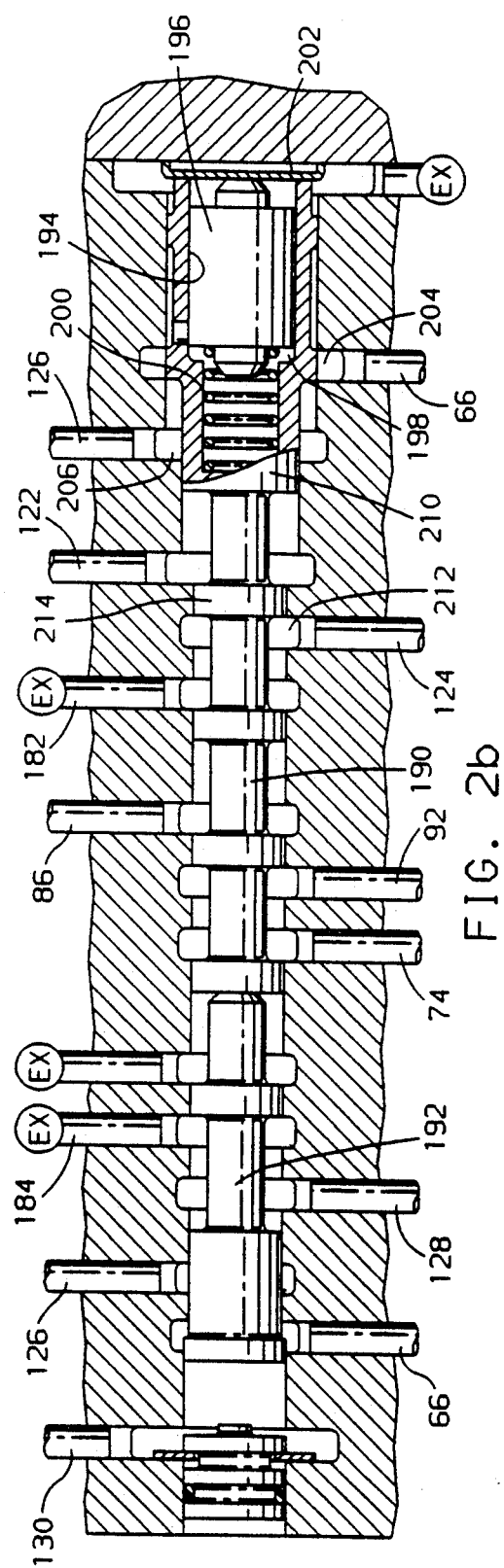

TRANSMISSION TORQUE CONVERTER CLUTCH DISABLE CONTROL

This invention relates to the control of a torque converter clutch in a motor vehicle automatic transmission, and more particularly, to a control that ensures disengagement of the clutch during conditions for which open converter operation is required.

BACKGROUND OF THE INVENTION

Torque converters have been utilized as an interface between a motor vehicle engine and transmission in order to conveniently achieve fully automatic operation and to increase the axle torque at vehicle launch. As the vehicle approaches a steady state operating point, however, the inherent slippage of the torque converter degrades fuel economy, and a fluid operated torque converter clutch (TCC) is engaged to provide a mechanical coupling between the engine and the transmission.

In practice, it is convenient to schedule engagement of the TCC as a predetermined function of vehicle speed (and engine load) to obtain a proper balance between driveability and fuel economy. At low vehicle speeds, open converter operation (TCC disengaged) is required to avoid lugging or stalling the engine, while at higher vehicle speeds, closed converter operation (TCC engaged) is desired to optimize fuel economy.

With the advent of electronic controls and the consequent ability to more accurately control the torque capacity of the TCC, it is possible to apply the TCC more extensively without adversely affecting driveability. In addition to providing fuel economy gains, early TCC engagement can also provide performance improvements under certain conditions.

SUMMARY OF THE PRESENT INVENTION

The present invention is directed to an improved electronic control which detects a condition of TCC engagement, when open converter operation is required, and activates an override mechanism which disengages the TCC independent of the normal TCC control valve in response to the detected condition, thereby to ensure that the TCC is disengaged when open converter operation is required.

The detection of TCC engagement at non-zero vehicle speeds involves identifying a condition of persistent nonslip at engine torque levels in excess of a threshold value. At zero vehicle speed, the persistent nonslip condition may not be conclusive of TCC engagement, and TCC engagement is indicated only if the condition is followed by engine stalling. Once TCC engagement is indicated by the detection logic, the override mechanism is activated to ensure TCC disengagement.

In the preferred embodiment of this invention, the override mechanism is implemented with a clutch priority valve of the type shown and described in U.S. Pat. No. 4,756,213, to Mainquist et al., issued Jul. 12, 1988, and assigned to the assignee of the present invention. As explained in the U.S. Pat. No. '213 patent, the normal function of the clutch priority valve is to hydraulically detect a condition in which two or more range clutches of an electronically controlled transmission are simultaneously pressurized for engagement, and to respond by disengaging the TCC and exhausting all but one of the range clutches.

The control of the present invention activates the TCC override function of the clutch priority valve in response to a detected condition of undesired TCC engagement by intentionally commanding the engagement of two or more range clutches. The clutch priority valve ensures that only one range clutch will be engaged, and the TCC override continues as long as the multiple clutch engagement is commanded. When the vehicle speed is sufficiently high to permit TCC engagement, all but one of the range clutch pressure commands are rescinded, and the clutch priority valve returns to its normal state, permitting TCC engagement.

BRIEF DESCRIPTION OF THE DRAWINGS

FIGS. 2a-2b depict the clutch priority valve of FIG. 1. FIG. 2a depicts the valve in a normal state, and FIG. 2b depicts the valve in an activated state.

DETAILED DESCRIPTION OF THE DRAWINGS

Figure 1:
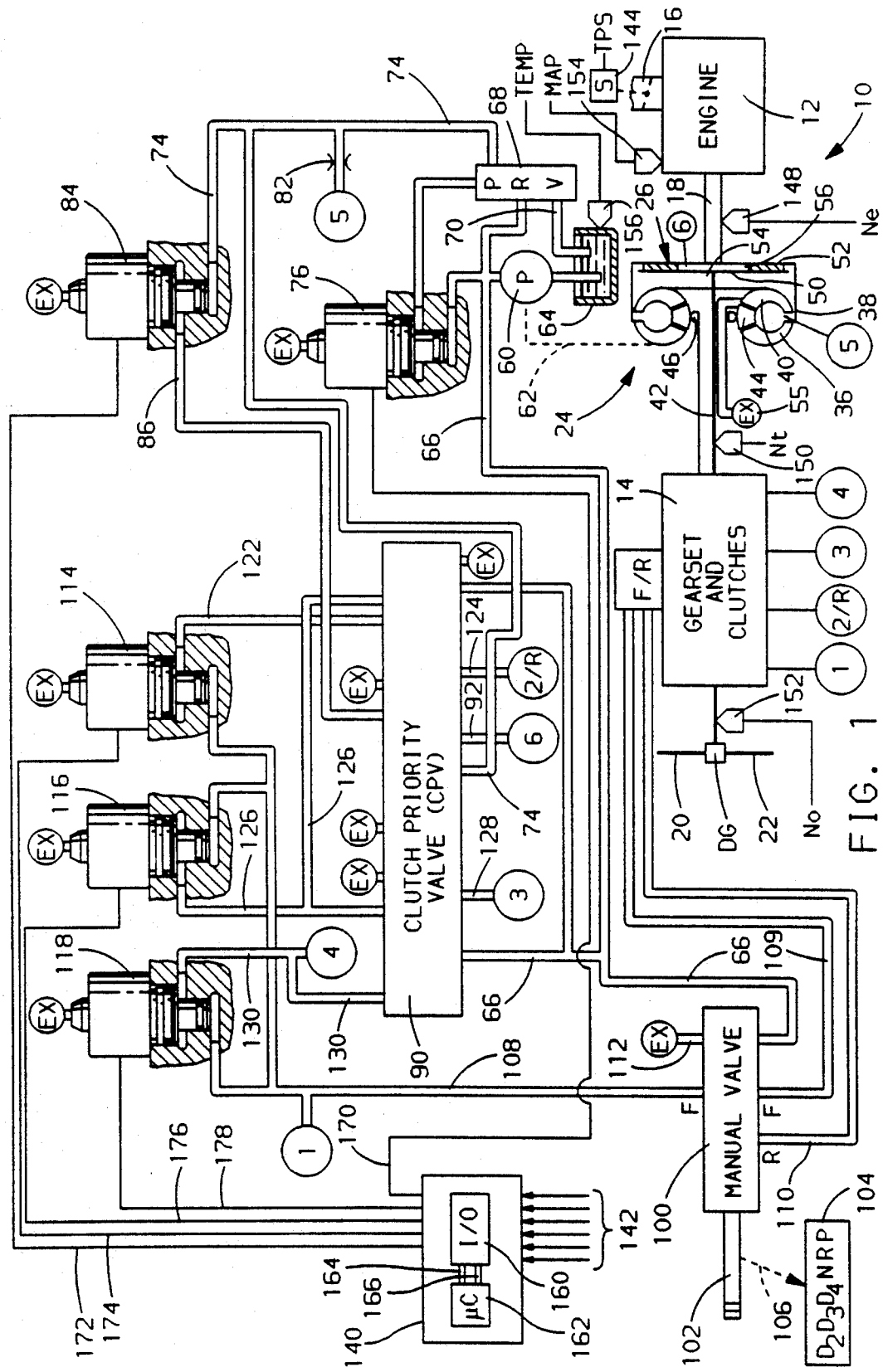
FIG. 1 is a schematic diagram of a transmission and control arrangement according to this invention, including a clutch priority valve and a computer-based control unit for suitably activating the various solenoid the transmission.

Referring to FIG. 1, the reference numeral 10 generally designates a motor vehicle drivetrain including an internal combustion engine 12 and an automatic transmission 14 providing a reverse speed ratio and four forward speed ratios. Engine 12 includes a throttle mechanism 16 mechanically connected to an operator manipulated device, such as an accelerator pedal (not shown), for regulating engine output torque, such torque being applied to the transmission 14 through the engine output shaft 18. The engine output torque is transmitted to a pair of drive axles 20 and 22 through a torque converter 24, one or more friction clutches of transmission 14, and a differential gearset DG.

The clutches of transmission 14 are individually supplied with fluid pressure to effect their engagement and disengagement according to a predetermined schedule for establishing a desired transmission speed ratio. In the illustrated embodiment, fluid supply for the 1st (lowest) speed ratio clutch is indicated by the circled numeral 1; fluid supply for the 2nd and Reverse speed ratio clutch is indicated by the circled designation 2/R; fluid supply for the 3rd speed ratio clutch is indicated by the circled numeral 3; and fluid supply for the 4th (highest) speed ratio clutch is indicated by the circled numeral 4. A forward/reverse servo (F/R) is employed to differentiate between forward and reverse operation. A representative transmission gearset is described in detail in U.S. Pat. No. 4,707,789, Downs et al., issued on Nov. 17, 1987, and assigned to General Motors Corporation.

Referring more particularly to the torque converter 24, the impeller or input member 36 is connected to be rotatably driven by the output shaft 18 of engine 12 through the input shell 38. The turbine or output member 40 is rotatably driven by the impeller 36 by means of fluid transfer therebetween and is connected to rotatably drive the transmission input shaft 42. A stator 44 redirects the fluid which couples the impeller 36 to the turbine 40, the stator 44 being connected through a one-way device 46 to the housing of transmission 14.

The torque converter 24 includes a clutching device 26, also referred to herein as the torque converter clutch or TCC, comprising a clutch plate 50 connected to rotate with the turbine 40. The clutch plate 50 has a friction surface 52 which is adapted to engage the inner surface of the input shell 38 to form a direct mechanical drive between the engine output shaft 18 and the transmission input shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, as shown in FIG. 1, thereby engaging the TCC 26 to provide a mechanical drive connection in parallel with the torque converter 24. When the fluid pressure in the release chamber 56 exceeds that in the apply chamber 54, the friction surface 52 of the clutch plate 50 is moved out of engagement with the input shell 38 thereby permitting slippage between the impeller 36 and the turbine 40. The circled numeral 5 represents a fluid connection to the apply chamber 54 and the circled numeral 6 represents a fluid connection to the release chamber 56. A fluid exhaust line 55 returns fluid from the torque converter 24 to a cooler (not shown).

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, PRV 68 provides a fluid pressure source (converter feed pressure) for torque converter 24 in line 74. The PRV 68 receives a bias pressure from solenoid valve 76 via line 80, which bias pressure opposes spring or other hydraulic bias pressures operating on PRV 68, so that the line and converter feed pressures vary in relation to the PWM duty cycle of valve 76.

While the pump and pressure regulator valve designs are not critical to the present invention, a representative pump is disclosed in U.S. Pat. No. 4,342,545 to Schuster, issued Aug. 3, 1982, and a representative pressure regulator valve is disclosed in U.S. Pat. No. 4,283,970 to Vukovich, issued Aug. 18, 1981, such patents being assigned to General Motors Corporation.

As indicated above, the state of TCC 26 is controlled by regulating the pressure in release chamber 56 relative to the apply chamber 54. Converter feed pressure in line 74 is supplied to apply chamber 54 via orifice 82, as indicated by the circled numeral 5, to ensure fluid flow through the converter 24 regardless of the state of TCC 26. The fluid pressure in release chamber 56 is electrically controlled by the PWM solenoid valve 84. The solenoid valve 84 receives converter feed pressure as an input via line 74, and develops a TCC release pressure in line 86 which varies in relation to the PWM duty cycle applied to the valve.

The TCC release pressure in line 86 is routed to TCC release chamber 56 via Clutch Priority Valve (CPV) 90 and fluid line 92. In normal operation, CPV 90 connects the lines 86 and 92 to enable engagement of TCC 26 via control of the PWM duty cycle of TCC solenoid valve 84. In an override mode of operation, however, the CPV valve 90 operates to interrupt the TCC release pressure connection, and to substitute a fluid connection between line 92 and the converter feed pressure in line 74. This supplies converter feed pressure to the TCC release chamber 56, ensuring TCC disengagement, regardless of the state of TCC solenoid valve 84. The normal and override modes of CPV 90 are described in further detail below in reference to FIGS. 2a and 2b, respectively.

The fluid pressures for the forward/reverse servo (F/R) and the various clutches of transmission gearset 14 are sourced through a Manual Valve 100 which receives axial mechanical input from the operator of the motor vehicle via shaft 102 in relation to the speed range the operator desires. The shaft 102 is also connected to an indicator mechanism 104 through a suitable mechanical linkage, as indicated generally by the broken line 106.

Line pressure in line 66 is applied as an input to Manual Valve 100 and the valve outputs include forward (F) range pressure lines 108–109 and a reverse (R) range pressure line 110. When the shaft 102 is moved to the D4, D3 or D2 positions, shown on the indicator mechanism 104, line pressure is directed to the forward range pressure lines 108–109. When the shaft 102 is moved to the R position, line pressure is directed to the reverse range pressure line 110. When the shaft 102 is moved to the N (neutral) or P (park) positions, line 66 is isolated, and the forward and reverse range pressure lines 108–110 are exhausted through exhaust port 112.

In the illustrated embodiment, the first gear clutch is pressurized in each of the forward ranges, as indicated by the circled numeral 1 connected to forward range pressure line 108. The first clutch is connected with its respective gear member through a one-way device which overruns when a clutch associated with a higher speed ratio is engaged.

The forward range pressure in line 108 is also supplied as an input to each of three PWM solenoid valves 114–118 for selective application to the transmission clutches associated with the 2nd, 3rd and 4th speed ratios. The 2/R solenoid valve 114 selectively directs forward range pressure to the 2/R clutch via CPV 90 and lines 122–124, as indicated by the circled designation 2/R at the terminus of line 24. The 3rd solenoid valve 116 selectively directs forward range pressure to the 3rd clutch via CPV 90 and lines 126–128, as indicated by the circled numeral 3 at the terminus of line 128. The 4th solenoid valve 118 selectively directs forward range pressure directly to the 4th speed ratio clutch, as indicated by the circled numeral 4 at the terminus of line 130. The line 130 is also supplied as an input to CPV 90 as shown.

As described above in relation to TCC 26, the CPV normally operates to establish fluid connections between the solenoid valves 114–116 and the respective clutches of transmission 14 to permit the selective establishment of a desired speed ratio through activation of the respective solenoid valve 114–118. Like the clutch priority valve set forth in the above-referenced U.S. patent to Mainquist et al., the purpose of CPV 90 is to detect the concurrent activation of two or more clutches by the solenoid valves 114–118, and to provide an override mode of operation in which only one of the clutches is activated and the TCC 26 is disengaged. A detailed description of CPV 90 is given below in reference to FIGS. 2a–2b.

A computer-based control unit 140 pulse width modulates the solenoid valves 76, 84 and 114–118 via lines 170–178 according to a predetermined control algorithm to regulate the fluid pressure supplied to PRV 68 and the transmission clutches, the duty cycle of such modulation being determined in relation to the desired magnitude of the supplied pressures. Input signals providing information concerning the engine 12, transmission 14 and driver inputs are applied to the control unit 140 via input lines 142. Such signals include engine throttle position TPS, as detected by the position sensor (S) 144; manual valve position MAN, as detected by the position sensor 144; engine, turbine and output speed Ne, Nt, No, as detected by the speed transducers 148, 150, 152; engine manifold absolute pressure MAP, as detected by the pressure transducer 154; and transmission fluid temperature TEMP, as detected by temperature sensor 156.

Physically, the control unit 140 includes an input-/output (I/O) device 160 for receiving the input signals and outputting the various pulse width modulation signals, and a microcomputer 162 which communicates with the I/O device 160 via an address-and-control bus 164 and a bi-directional data bus 166. Flow diagrams representing suitable program instructions for execution by microcomputer 162 are depicted in FIGS. 3, 4, 5a–5b and 6–7.

Referring now to FIGS. 2a–2b, the operation of CPV 90 is explained in detail. As indicated above, FIG. 2a depicts the valve in its normal state, while FIG. 2b depicts the valve during an override mode of operation. It will be noted that in the normal position of CPV 90, the 2/R feed pressure in line 122 from solenoid valve 114 is connected to the 2/R clutch via line 124, the 3rd feed pressure in line 126 from solenoid valve 116 is connected to the 3rd clutch via line 128, and the TCC release pressure in line 86 from solenoid valve 84 is connected to release chamber 56 via line 92. In a first override mode, the 2/R clutch is exhausted via port 182, and the release chamber 56 is supplied with converter feed pressure via lines 74 and 92 to disable engagement of TCC 26. In a second override mode, the 3rd clutch is also exhausted via port 184.

The CPV 90 includes primary and secondary spools 190 and 192 which are coaxially aligned in a stepped diameter valve bore. The primary spool 190 has an internal cavity 194 and a plug 196 slidably disposed therein. Together, the cavity 194 and plug 196 form a closed chamber 198 in which is disposed a spring 200. The spring 200 biases the spools 190–192 leftward, and the plug 196 rightward into engagement with stop 202. The chamber 198 is in fluid communication with line pressure supplied via port 204, which pressure also biases spool 190 leftward as viewed in FIGS. 2a–2b.

Another bias force is exerted by the 3rd feed pressure which is supplied to the chamber 206, exerting a rightward bias on spool 190 whenever the 3rd feed passage 126 is pressurized. The spool lands are sized such that this rightward bias is less than the combined leftward bias of spring 200 and the line pressure in chamber 198.

Another bias force is exerted by the 2/R feed pressure which is supplied via port 212 to the differential area between lands 210 and 214 of spool 190. This exerts a rightward bias on spool 190 whenever the 2/R feed passage 122 is pressurized, which bias is also less than the combined leftward bias of spring 200 and the line pressure in chamber 198.

If both 3rd and 2/R feed passages are concurrently pressurized by solenoid valves 114 and 16, the combined rightward biases will exceed the combined leftward bias of spring 200 and the line pressure in chamber 198. The net rightward bias will move spool 190 rightward, exhausting the 2/R clutch and disabling TCC engagement as described above. The result is that the 3rd clutch is engaged, and the 2/R clutch released, even if both solenoid valves 114 and 116 are activated.

In the above condition, the spool 192 is independently biased leftward by line pressure in chamber 218 due to the differential area of spool lands 220 and 222. If the 4th feed passage 130 is additionally pressurized, however, the fluid pressure acting on the left end of land 220 creates a rightward bias on both spools 190 which moves the spool 192 rightward, exhausting the 3rd clutch as well. In this case, only the 4th clutch remains engaged. A similar result occurs if the 2/R and 4th feed passages 122, 130 or the 3rd and 4th feed passages 126, 130 are concurrently pressurized. If the primary spool 190 is in its normal (leftward) position, however, the rightward bias due to the 4th feed passage would be insufficient, of itself, to overcome the leftward bias acting on spool 190.

It is thus apparent that the CPV 90 operates when two or more of the feed passages 122 (2/R), 126 (3rd), and 130 (4th) are concurrently pressurized by disabling engagement of TCC 26, and engaging a single clutch corresponding to the highest pressurized gear. This operation is additionally utilized, according to the present invention, to disable TCC engagement if TCC engagement is detected during conditions under which open converter operation is required.

If TCC engagement is detected at zero vehicle speed, before the manual selector shaft 102 is positioned in a forward drive range, the control unit 40, according to the illustrated embodiment, concurrently activates the 2/R, 3rd and 4th solenoid valves 114, 116 and 118, causing spools 190 and 192 of CPV 90 to shift rightward as soon as the pressure in the respective feed passages 122, 126 and 130 begins to build. This will avoid engine stalling by disengaging TCC 26, while launching the vehicle in 4th. While concurrent activation of the 2/R and 3rd solenoid valves 114 and 116 would potentially permit a 3rd gear launch, the additional activation of 4th solenoid valve 118 ensures prompt activation of the spools 190–192 upon displacement of the range selector shaft 102 to a forward drive range. Once the vehicle reaches a predetermined speed, such as 20 MPH, for example, the redundant solenoid valve activation is terminated, permitting engagement of the TCC 26.

If TCC engagement is detected during operation of the vehicle in a forward drive range at non-zero vehicle speed, the control unit 140, according to the illustrated embodiment, concurrently activates the 2/R and 3rd solenoid valves 114 and 116 when the vehicle speed drops below the predetermined speed. This activates the CPV 90 to disable engagement of TCC 26, and to maintain the transmission in 3rd until the predetermined vehicle speed is subsequently exceeded.

Figure 3:
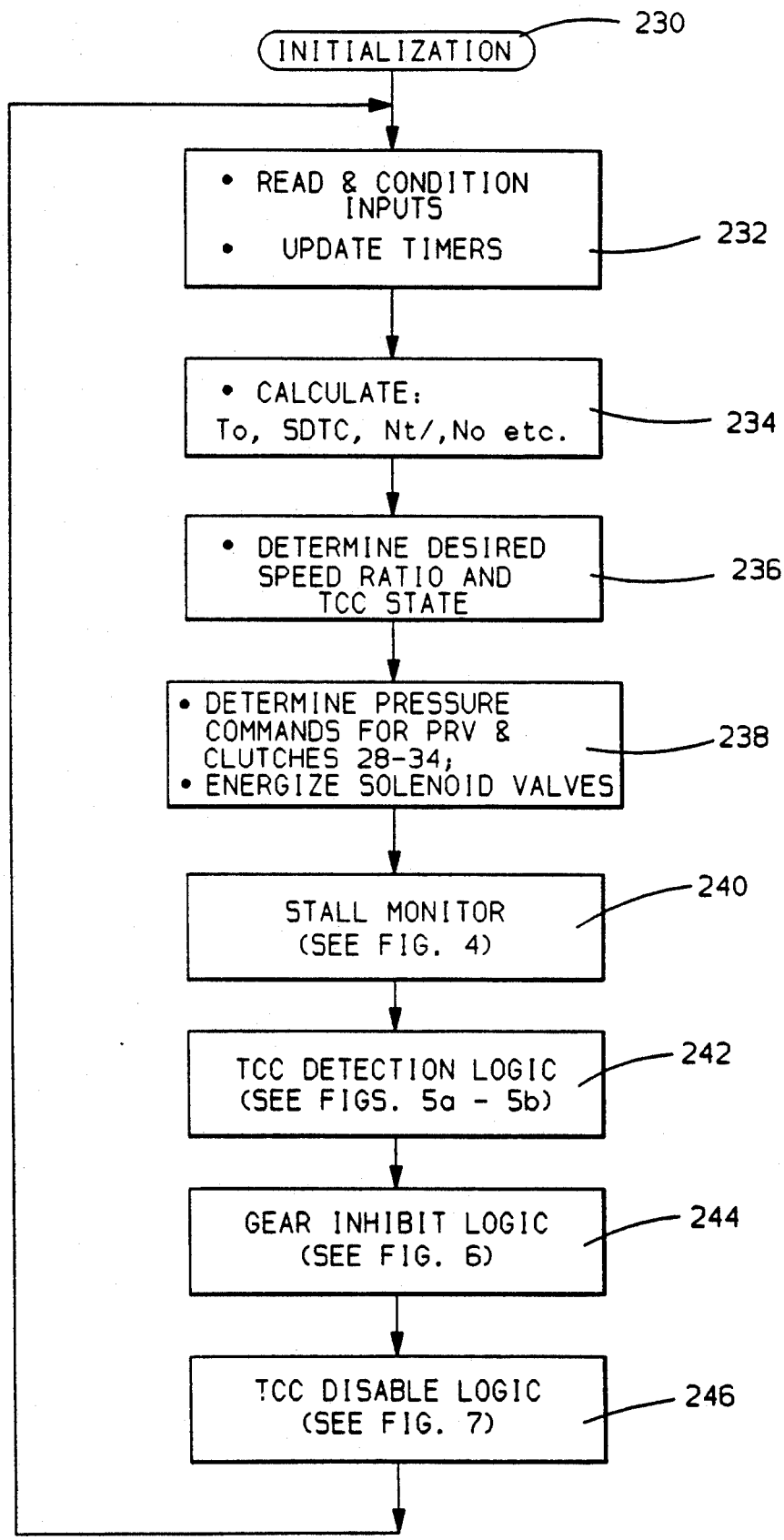
FIGS. 3-4, 5a-5b and 6-7 depict flow diagrams representative of computer program instructions executed by the computer-based control unit of FIG. 1 in carrying out the control of this invention.

The flow diagrams of FIGS. 3–4, 5a–5b and 6–7 represent program instructions to be executed by the microcomputer 162 of control unit 140 in mechanizing the TCC control of this invention. The flow diagram of FIG. 3 represents a main or executive program which calls various subroutines for executing particular control functions as necessary. The flow diagrams of FIGS. 4, 5a–5b and 6–7 represent the functions performed by those subroutines which are pertinent to the present invention.

Referring to the main loop program of FIG. 3, the reference numeral 230 designates a set of program instructions executed at the initiation of each period of vehicle operation for initializing the various tables, timers, etc., used in carrying out the control functions of this invention. Following such initialization, the instruction blocks 232-246 are repeatedly executed in sequence, as designated by the flow diagram lines. Instruction block 232 reads and conditions the various input signals applied to I/O device 160 via the lines 142 and calculates various terms used in the control algorithms, including the input torque Ti, the speed ratio Nt/No and the speed difference SDTC across torque converter 24. The block 236 determines the desired state of TCC 26 and the desired speed ratio, Rdes, in accordance with a number of inputs including present ratio Ract, throttle position TPS, vehicle speed Nv, manual valve position, and the status of flag bits which inhibit the activation of certain speed ratios. The block 238 determines if a shift is desired, determines the required pressure commands, and activates the solenoid valves 76, 84 and 114-118 accordingly.

Figure 4:
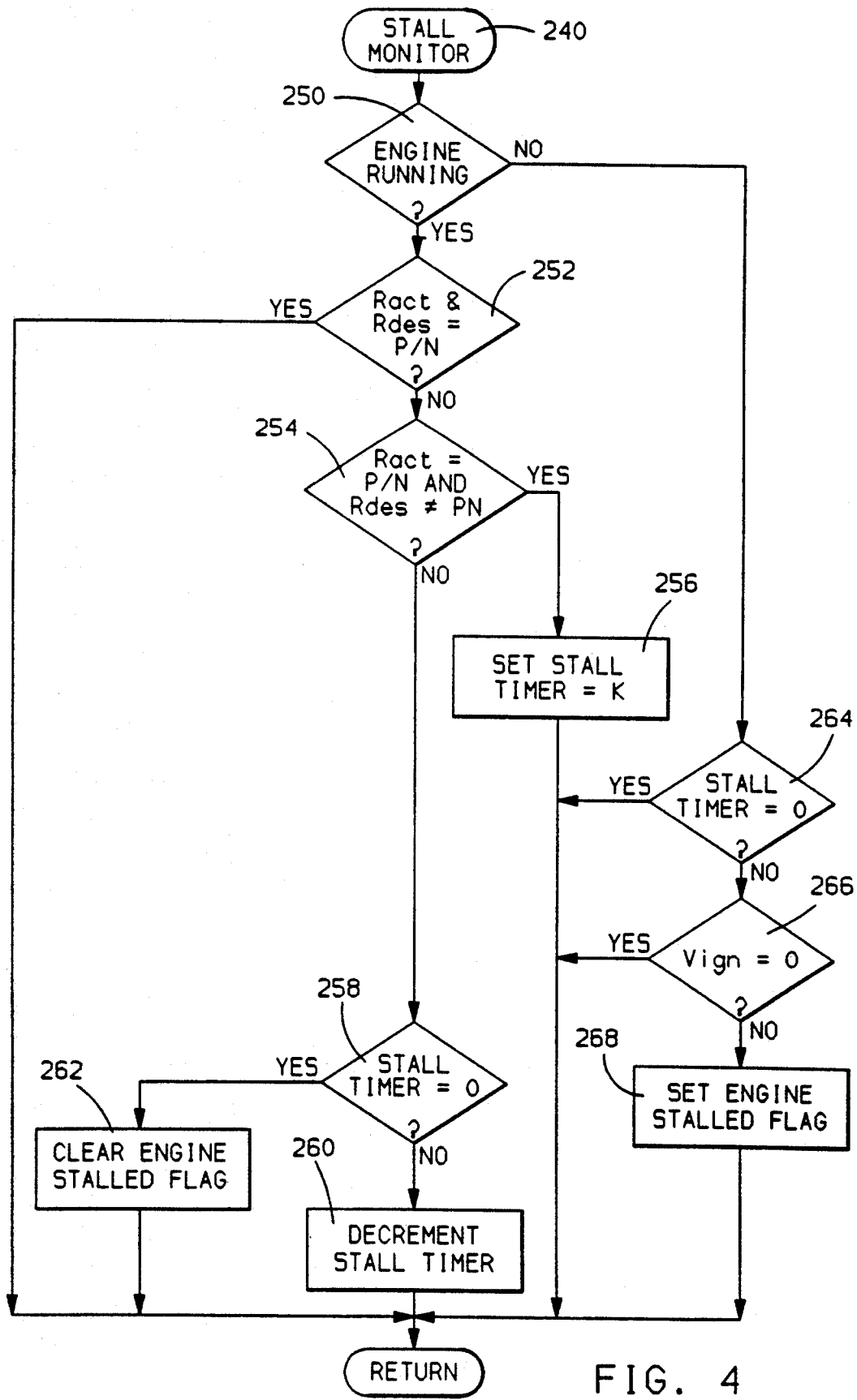

The block 240, designated STALL MONITOR, determines if engine stalling has occurred, and is set forth in detail in the flow diagram of FIG. 4 as indicated. The block 242, designated TCC DETECTION LOGIC, detects unwanted TCC energization, and is set forth in detail in the flow diagrams of FIGS. 5a-5b. The block 244, designated GEAR INHIBIT LOGIC, reduces the availability of certain speed ratios in the event of unwanted TCC engagement, and is set forth in detail in the flow diagram of FIG. 6. The block 246, designated TCC DISABLE LOGIC, suitably activates the solenoid valves 114-118 in the event of unwanted TCC engagement, and is set forth in detail in the flow diagram of FIG. 7.

Referring to the STALL MONITOR flow diagram of FIG. 4, the block 250 is first executed to determine if the engine is running. If so, the blocks 252 and 254 are executed to detect initiation of a garage shift from Park or Neutral (P/N) to Drive or Reverse. In this regard, Rdes refers to the desired ratio determined at block 236 of the main program loop, and Ract refers to the actual speed ratio, as judged by the ratio Nt/No. If block 252 is answered in the affirmative, the transmission and range selector are both in P/N, and the remainder of the routine is skipped. If block 252 is answered in the negative, and block 254 is answered in the affirmative, the initiation of a garage shift is detected, and the block 256 is executed to initialize a STALL TIMER to a predetermined value K.

Once the garage shift actually occurs, blocks 252 and 254 will both be answered in the negative, and the block 258 is executed to determine if the STALL TIMER is zero. If not, block 260 is executed to decrement the STALL TIMER; if so, block 262 is executed to clear a nonvolatile ENGINE STALLED flag within control unit 140. If the engine stalls before the STALL TIMER is decremented to zero, as determined by blocks 250, 264 and 266, the block 268 is executed to set the ENGINE STALLED flag, completing the routine. Thus, the STALL MONITOR routine operates to set the ENGINE STALL flag if the engine stalls within a predetermined time after initiation of a garage shift.

Figure 5A:
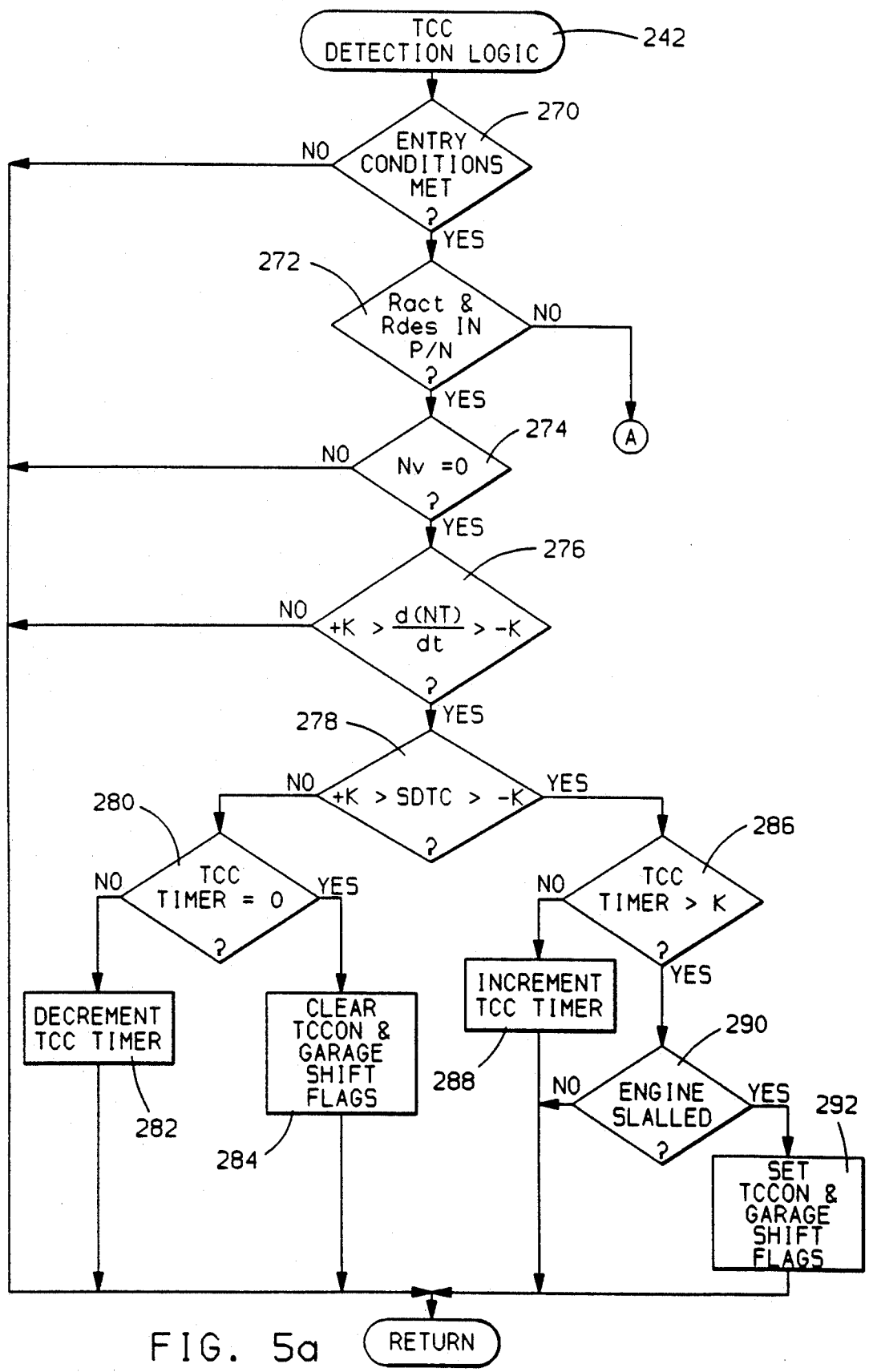
Figure 5B:
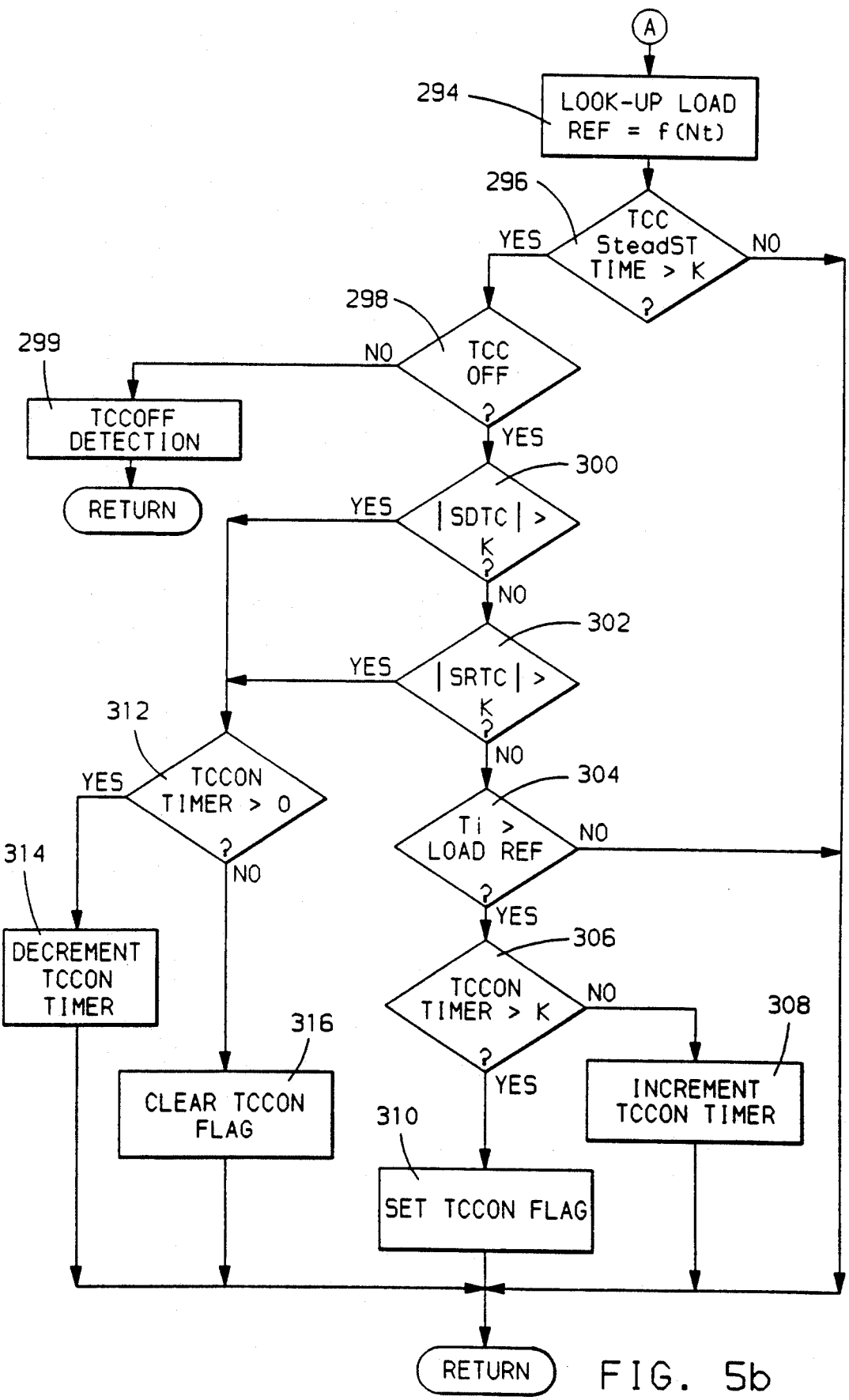
Figure 6:
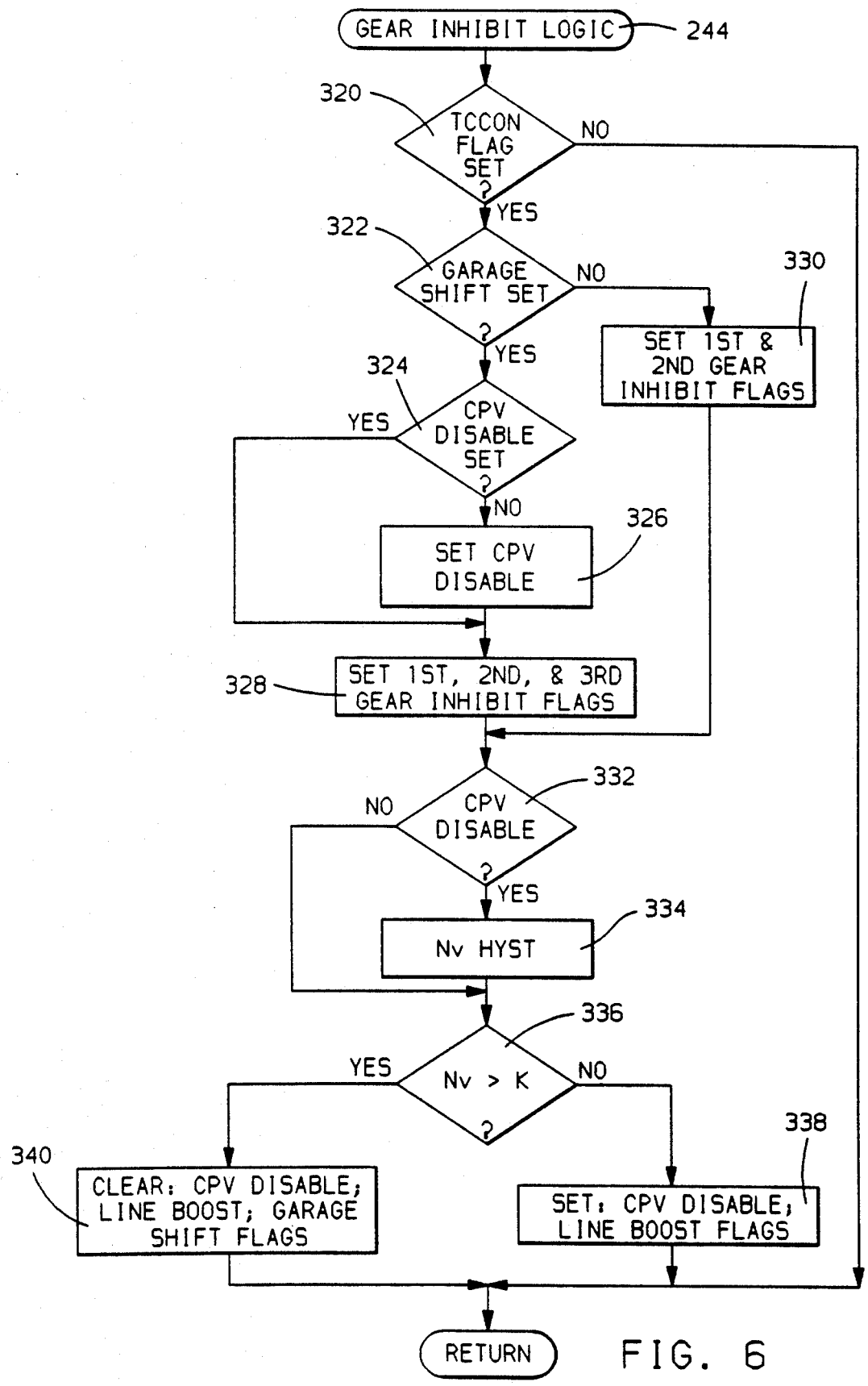

Referring to the TCC DETECTION LOGIC routine 242 of FIGS. 5a-5b, the block 270 is first executed to determine if the TCC engagement detection entry conditions are met. These conditions may include, for example, sensor output verification and engine speed greater than a reference value. If the entry conditions are met, the block 272 is executed to determine if both Rdes and Ract are in P/N. If so, blocks 274 and 276 are executed to determine if the vehicle speed is zero, and the turbine acceleration d(Nt)/dt is within a reference window defined by ±K. If these conditions are met as well, the block 278 is executed to determine if the speed differential SDTC across torque converter 24 is within a deadband about zero, defined by ±K.

If SDTC is not within the deadband, disengagement of TCC 26 is indicated, and the blocks 280-282 are executed to decrement a TCC TIMER. When the TCC TIMER reaches zero, block 284 is executed to clear the TCCON and GARAGE SHIFT flags. The TCCON flag indicates an unwanted engagement of TCC 26, and the GARAGE SHIFT flag indicates an unwanted engagement of TCC 26 in P/N. If SDTC is outside the deadband, engagement of TCC 26 is indicated, and the blocks 286-288 are executed to increment the TCC TIMER until the timer value reaches a reference K. Once the reference is exceeded, and the ENGINE STALLED flag is set, as determine by blocks 286 and 290, the block 292 is executed to set the TCCON and GARAGE SHIFT flags.

Implicit in the above-described routine is the recognition that TCC engagement at zero vehicle speed in P/N is difficult to reliably detect. According to the illustrated embodiment, TCC engagement under such conditions is confirmed by the occurrence of the conditions defined by blocks 278, 286 and 290—that is, SDTC within ±K, TCC TIMER>K, and ENGINE STALLED flag set.

The flow diagram of FIG. 5b is executed when block 272 is answered in the negative, indicating the achievement of a forward or reverse drive state. In this case, the TCC engagement detection is predicated on engine load, SDTC, and the speed ratio SRTC across torque converter 24. Initially, the block 294 is executed to look-up a turbine speed dependent reference load, LOAD REF. If the control unit 140 has commanded the TCC 26 to an engaged state for at least a predetermined interval K, as determined by blocks 296-298, the block 299 is executed to perform diagnostic checks to determine if the TCC 26 is actually disengaged. If the TCC 26 has been commanded to a disengaged state for at least the predetermined interval K, the blocks 300-302 are executed to compare the SDTC and SRTC magnitudes to predetermined reference values. If both conditions are answered in the negative, and the transmission input torque Ti is greater than LOAD REF, as determined at block 304, TCC engagement is indicated. In this case, the blocks 306-308 are executed to increment a TCCON TIMER toward a reference count K. When the reference count is reached, the block 310 is executed to set the TCCON flag, indicating a condition of TCC engagement when not commanded by control unit 140.

If the speed differential or speed ratio conditions defined at blocks 300-302 are answered in the affirmative, TCC disengagement is indicated, and the blocks 312-314 are executed to decrement the TCCON TIMER toward zero. When the count reaches zero, the block 316 is executed to clear the TCCON flag.

Figure 7:
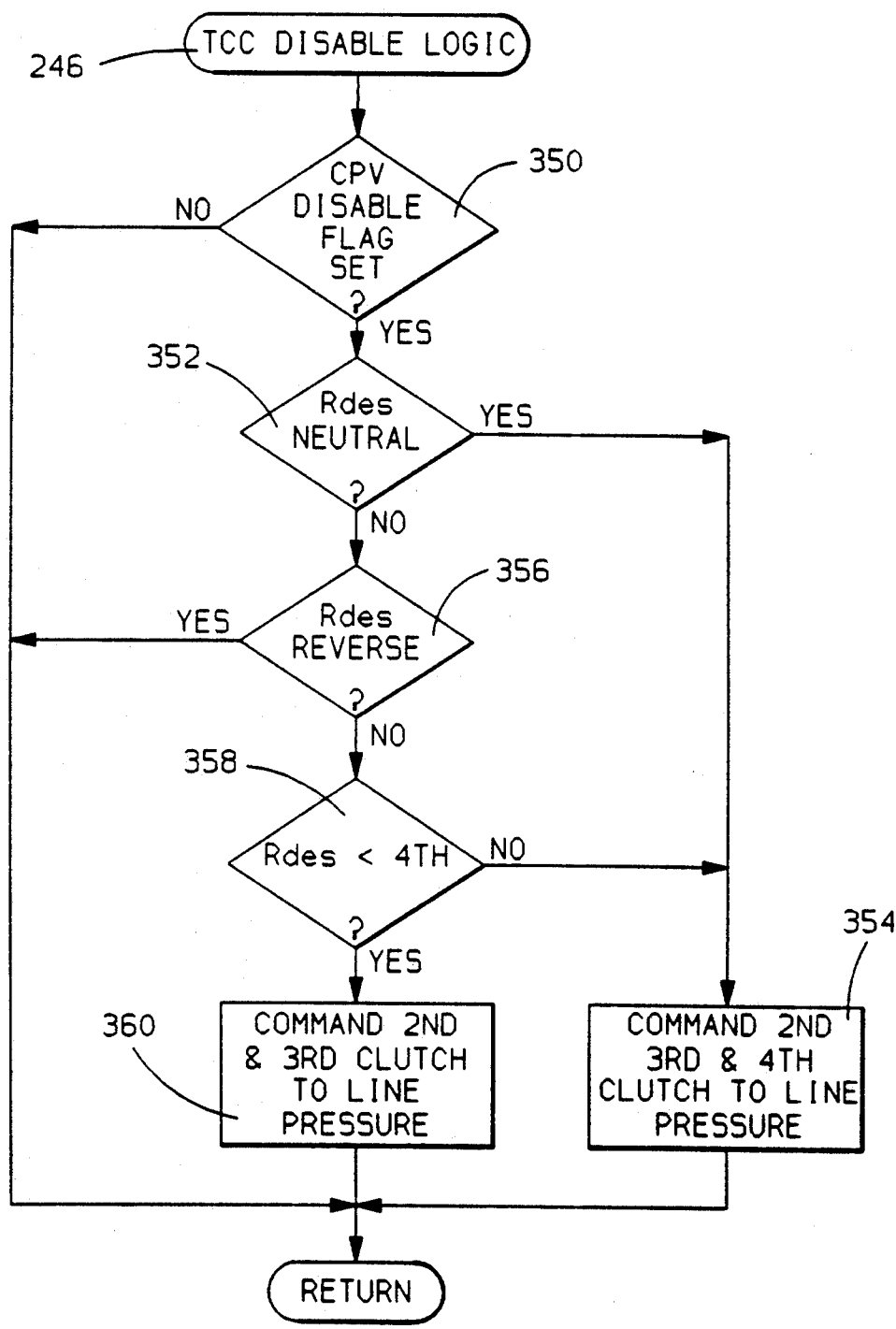

Referring now to the GEAR INHIBIT LOGIC flow diagram of FIG. 7, the blocks 320-322 are first executed to determine if the TCCON and GARAGE SHIFT flags are both set. If so, the blocks 324-328 are executed to set the CPV DISABLE flag if it is not already set, and to set the 1st, 2nd and 3rd GEAR INHIBIT flags. As explained below, the CPV DISABLE flag is used to trigger a disable of TCC engagement with the CPV 90. The GEAR INHIBIT flags operate to effectively remove the respective gears from the shift pattern logic of main loop block 236. When block 328 is executed, the 1st, 2nd and 3rd speed ratios are all inhibited since a 4th gear launch is to be initiated.

If the TCCON flag is set, but the GARAGE SHIFT flag is not set, the block 330 is executed in place of the blocks 324-328, setting the 1st and 2nd GEAR INHIBIT flags only. In this case, only the 1st and 2nd speed ratios are removed from the shift pattern since the appropriate override speed ratio is 3rd gear.

So long as the CPV DISABLE flag is set, as determined at block 332, the block 334 is executed to add a hysteresis term HYST to the measured vehicle speed Nv for stability. If the vehicle speed is less than or equal to a speed reference K (such as 20 MPH), as determined at block 336, the block 338 is executed to set the CPV DISABLE and LINE BOOST flags, signaling a desired activation of CPV 90. The LINE BOOST flag signals the PRV control of main loop block 238 to increase the line pressure in anticipation of a 3rd or 4th gear launch of the vehicle. If the vehicle speed is above the speed reference K, the block 340 is executed to clear the CPV DISABLE, LINE BOOST and GARAGE SHIFT flags. This signals a desired deactivation of CPV 90, and results in the resetting of the 3rd GEAR INHIBIT flag by block 330 in the next execution of the routine, permitting operation in 3rd or 4th speed ratios.

Referring to the TCC DISABLE LOGIC of FIG. 7, the block 350 is first executed to determine if the CPV DISABLE flag is set. If so, and the desired ratio Rdes is neutral, as determined at block 352, the block 354 is executed to command the 2/R, 3rd and 4th solenoid valves 114, 116 and 118 fully on to supply line pressure to output lines 122, 126 and 130. As described in reference to FIGS. 1 and 2a-2b, this has the effect of quickly activating CPV 90 once the garage shift to a forward drive range has occurred, thereby shifting the transmission to 4th and hydraulically disabling engagement of TCC 26. If Rdes is Reverse, as determined at block 356, the routine is exited since activation of CPV 90 would serve no useful purpose. If Rdes is less than 4th, as determined at block 358, the block 360 is executed to command the 2/R and 3rd solenoid valves 114 and 116 fully on to supply line pressure to output lines 122 and 126. As described in reference to FIGS. 1 and 2a-2b, this has the effect of activating spool 190 of CPV 90, thereby shifting the transmission to 3rd, and hydraulically disabling engagement of TCC 26. If Rdes is equal to 4th, as in the event of a 4th gear launch, the block 354 is executed to command the 2/R, 3rd and 4th solenoid valves 114, 116 and 118 fully on as described above.

The operation of the TCC control according to this invention is now summarized. If an unwanted TCC engagement is detected when the transmission 14 is in a Park or Neutral, zero output speed state, causing engine stalling to occur, the control unit 140 energizes the solenoids 114, 116 and 118 in anticipation of a garage shift to a forward drive range. Upon initiation of the garage shift, spools 190 and 192 of CPV 90 move rightward to disable engagement of TCC 26 and to exhaust the 2/R and 3rd clutches, providing a 4th gear launch of the vehicle. At the same time, the 1st, 2nd and 3rd speed ratios are removed from the shift pattern logic.

When the vehicle speed exceeds the 20 MPH speed reference, the solenoid valves 114 and 116 are deenergized, and the 3rd speed ratio is made available to the shift pattern logic. This returns CPV 90 to its normal state to permit TCC engagement and enables essentially normally vehicle operation in 3rd or 4th speed ratios. When the vehicle speed subsequently falls below the 20 MPH speed reference, the desired speed ratio will be 3rd, and the control unit 140 independently energizes the solenoid valves 114 and 116. This biases spool 190 of CPV 90 rightward to exhaust the 2/R clutch, maintaining the transmission 14 in 3rd gear until the speed ratio is subsequently exceeded.

In the manner described above, the control of this invention operates to detect a condition of TCC engagement when open converter operation is required, and to activate an override mechanism which disengages TCC 26 independent of the normal TCC control valve in response to the detected condition, thereby ensuring that TCC 26 is disengaged when open converter operation is required. This enables continued operation of the vehicle under conditions which would otherwise render the vehicle inoperable.

While described in reference to the illustrated embodiment, it is expected that various modifications will occur to those skilled in the art. In this regard, it should be understood that controls incorporating such modifications may fall within the scope of this invention, which is defined by the appended claims.

The embodiments of the invention in which an exclusive property or privilege is claimed are defined as follows:

1. Control apparatus for a motor vehicle transmission having a torque converter and a selectively engageable torque converter clutch TCC for mechanically bypassing said torque converter, the control apparatus comprising:
   a solenoid-operated converter clutch valve selectively energizable to pressurize or exhaust a TCC release passage for respectively releasing or engaging said TCC;
   control means for energizing said converter clutch valve to engage said TCC except when torque converter operation is required;
   override valve means operative when actuated for pressurizing said TCC release passage independent of said converter clutch valve to ensure disengagement of said TCC;
   detection means for generating an override signal in response to a detected condition of TCC engagement when torque converter operation is required; and
   override means for actuating said override valve means in response to said override signal, thereby to ensure disengagement of said TCC when torque converter operation is required.

2. The control apparatus set forth in claim 1, including an engine connected to said transmission to drive said vehicle, said detection means including:
   means for identifying a neutral condition of said transmission in which none of said range clutches are engaged, and an output shaft of said transmission is substantially stationary;
   means for monitoring a speed differential across said torque converter to detect a condition of probable TCC engagement;

means for detecting a condition of engine stalling; and means for generating said override signal when said conditions of probable TCC engagement and engine stalling are detected during said neutral condition.

3. The control apparatus set forth in claim 1, where said detection means comprises:

means for monitoring a speed differential and a speed ratio across said torque converter; and means for generating said override signal when said monitored speed differential and speed ratio are substantially indicative of TCC engagement for at least a predetermined period of time.

4. The control apparatus set forth in claim 1, including:

means effective so long as a reference vehicle speed is exceeded for interrupting the actuation of said override valve, thereby to enable engagement of said TCC.

5. Control apparatus for a motor vehicle transmission having a torque converter, a selectively engageable torque converter clutch TCC for bypassing said torque converter, and a plurality of speed ratios established by engaging respective fluid pressure operated friction devices, the control apparatus comprising:

a plurality of solenoid-operated clutch control valves individually energizable to pressurize an apply passage for a range clutch associated with a desired speed ratio;

a solenoid-operated converter clutch valve selectively energizable to pressurize or exhaust a TCC release passage for respectively releasing or engaging said TCC;

control means for scheduling the energization of said converter clutch valve in relation to the achievement of specified vehicle operating parameters;

priority valve means activated in response to pressurization of two or more of said apply passages to exhaust all but one of such apply passages so that only one such range clutch is engaged, and for pressurizing said TCC release passage independent of said converter clutch valve to ensure disengagement of said TCC;

detection means for generating an override signal in response to a detected condition of TCC engagement at a time when said control means is not scheduling energization of said converter clutch valve; and override means responsive to said generated override signal for concurrently energizing at least two of said solenoid operated clutch valves to achieve activation of said priority valve, thereby to disable engagement of said TCC.

6. The control apparatus set forth in claim 5, including an engine connected to said transmission, said detection means including:

means for identifying a neutral condition of said transmission in which none of said range clutches are engaged, and an output shaft of said transmission is substantially stationary;

means for monitoring a speed differential across said torque converter to detect a condition of probable TCC engagement;

means for detecting a condition of engine stalling; and means for generating said override signal when said conditions of probable TCC engagement and engine stalling are detected during said neutral condition.

7. The control apparatus set forth in claim 5, where said detection means comprises:

means for monitoring a speed differential and a speed ratio across said torque converter; and means for generating said override signal when said monitored speed differential and speed ratio are substantially indicative of TCC engagement for at least a predetermined period of time.

8. The control apparatus set forth in claim 5, including:

means effective so long as a reference vehicle speed is exceeded for discontinuing the concurrent energization of said solenoid operated clutch valves, thereby to deactivate said priority valve and enable engagement of said TCC.

* * * * *